(12) United States Patent
Jun

(10) Patent No.: US 11,153,586 B2
(45) Date of Patent: Oct. 19, 2021

(54) IMAGE PROCESSING DEVICE AND FRAME BUFFER COMPRESSOR

(71) Applicant: Samsung Electronics Co., Ltd., Suwon-si (KR)

(72) Inventor: Sung Ho Jun, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/545,501

(22) Filed: Aug. 20, 2019

(65) Prior Publication Data

US 2020/0177899 A1    Jun. 4, 2020

(30) Foreign Application Priority Data

Nov. 30, 2018 (KR) .................. 10-2018-0151752

(51) Int. Cl.
| | |
|---|---|
| *H04N 5/917* | (2006.01) |
| *H04N 5/84* | (2006.01) |
| *H04N 5/89* | (2006.01) |
| *H04N 5/93* | (2006.01) |
| *H04N 19/91* | (2014.01) |
| *H04N 19/103* | (2014.01) |
| *H04N 19/124* | (2014.01) |
| *H04N 19/423* | (2014.01) |
| *H04N 19/159* | (2014.01) |

(52) U.S. Cl.
CPC ......... *H04N 19/423* (2014.11); *H04N 19/103* (2014.11); *H04N 19/124* (2014.11); *H04N 19/159* (2014.11); *H04N 19/91* (2014.11)

(58) Field of Classification Search
USPC ........ 386/328, 329, 326, 330, 355, 356, 353
See application file for complete search history.

(56) References Cited

U.S. PATENT DOCUMENTS

| | | | |
|---|---|---|---|
| 6,118,903 A | 9/2000 | Liu | |
| 6,201,834 B1 | 3/2001 | Zhu | |
| 6,937,767 B1 | 8/2005 | Burak et al. | |
| 7,206,453 B2 | 4/2007 | Lee et al. | |
| 7,848,586 B2 | 12/2010 | Kim et al. | |
| 8,300,959 B2 | 10/2012 | Ahn et al. | |
| 8,582,663 B2 * | 11/2013 | Hannuksela | H04N 19/577 375/240.26 |
| 8,666,186 B1 | 3/2014 | Rasche | |
| 9,113,165 B2 | 8/2015 | Gish et al. | |

(Continued)

FOREIGN PATENT DOCUMENTS

| | | |
|---|---|---|
| JP | 2013-239893 A | 11/2013 |
| JP | 2015-035720 A | 2/2015 |

*Primary Examiner* — Daquan Zhao
(74) *Attorney, Agent, or Firm* — Muir Patent Law, PLLC

(57) ABSTRACT

An image processing device includes a multimedia IP including a plurality of IP cores, at least one of which processes image data to generate source data, a frame buffer compressor, shared by the plurality of IP cores, compressing the source data to generate compressed data, and a memory coupled to the frame buffer compressor and accessed by the multimedia IP through the frame buffer compressor so that the compressed data is stored in the memory. The frame buffer compressor includes a quantization module which performs quantizing on the source data to generate recon data and a prediction module which executes intra-prediction on the recon data to generate prediction data.

19 Claims, 17 Drawing Sheets

(56) References Cited

U.S. PATENT DOCUMENTS

| | | | |
|---|---|---|---|
| 9,288,453 B2 | 3/2016 | Jiang et al. | |
| 9,299,166 B2 | 3/2016 | Lachine et al. | |
| 9,349,156 B2 | 5/2016 | Croxford et al. | |
| 9,497,488 B2 | 11/2016 | Cheong et al. | |
| 9,774,875 B2 | 9/2017 | Macinnis et al. | |
| 2002/0044695 A1 | 4/2002 | Bostrom | |
| 2007/0025441 A1* | 2/2007 | Ugur | H04N 19/174 375/240.03 |
| 2007/0189382 A1* | 8/2007 | Park | H04N 19/61 375/240.08 |
| 2009/0060027 A1 | 3/2009 | Ferguson | |
| 2009/0268820 A1* | 10/2009 | Nishida | H04N 19/52 375/240.16 |
| 2011/0150072 A1 | 6/2011 | Han | |
| 2011/0292247 A1 | 12/2011 | Gharavi-alkhansari et al. | |
| 2012/0219231 A1* | 8/2012 | Gharavi-Alkhansari | H04N 19/184 382/238 |
| 2013/0215972 A1* | 8/2013 | Jax | H04N 19/91 375/240.23 |
| 2014/0192075 A1 | 7/2014 | Stamoulis et al. | |
| 2017/0188026 A1 | 6/2017 | Wu et al. | |
| 2018/0027096 A1 | 1/2018 | Michael et al. | |

\* cited by examiner

Fig. 4

| s(0, 0) | s(0, 1) | s(0, 2) | s(0, 3) |
|---------|---------|---------|---------|
| 88 | 89 | 93 | 96 |
| s(1, 0) | s(1, 1) | s(1, 2) | s(1, 3) |
| 95 | 96 | 99 | 100 |
| s(2, 0) | s(2, 1) | s(2, 2) | s(2, 3) |
| 101 | 103 | 105 | 109 |
| s(3, 0) | s(3, 1) | s(3, 2) | s(3, 3) |
| 105 | 110 | 113 | 120 |

Fig. 5

| s(0, 0) | s(0, 1) | s(0, 2) | s(0, 3) |
|---|---|---|---|
| 88 | 89 | 93 | 96 |
| s(1, 0) | r(0, 0) | r(0, 1) | r(0, 2) | r(0, 3) |
| 95 | 22 | 22 | 23 | 24 |
| s(2, 0) | r(1, 0) | r(1, 1) | r(1, 2) | r(1, 3) |
| 101 | 23 | 24 | 24 | 25 |
| s(3, 0) | r(2, 0) | r(2, 1) | r(2, 2) | r(2, 3) |
| 105 | 25 | 25 | 26 | 27 |
| | r(3, 0) | r(3, 1) | r(3, 2) | r(3, 3) |
| | 26 | 27 | 28 | 30 |

Fig. 6

| r(0, 0) | r(0, 1) | r(0, 2) | r(0, 3) |
|---|---|---|---|
| 22 | 22 | 23 | 24 |
| r(1, 0) | p(0, 0) | p(0, 1) | p(0, 2) | p(0, 3) |
| 23 | 22 | 22 | 23 | 24 |
| r(2, 0) | p(1, 0) | p(1, 1) | p(1, 2) | p(1, 3) |
| 25 | 1 | 2 | 1 | 1 |
| r(3, 0) | p(2, 0) | p(2, 1) | p(2, 2) | p(2, 3) |
| 26 | 2 | 1 | 2 | 2 |
|  | p(3, 0) | p(3, 1) | p(3, 2) | p(3, 3) |
|  | 1 | 2 | 2 | 3 |

Fig. 7

| s(0, 0) | s(0, 1) | s(0, 2) | s(0, 3) |
|---|---|---|---|
| 88 | 89 | 93 | 96 |
| s(1, 0) | p(0, 0) | p(0, 1) | p(0, 2) | p(0, 3) |
| 95 | 88 | 89 | 93 | 96 |
| s(2, 0) | p(1, 0) | p(1, 1) | p(1, 2) | p(1, 3) |
| 101 | 7 | 7 | 6 | 4 |
| s(3, 0) | p(2, 0) | p(2, 1) | p(2, 2) | p(2, 3) |
| 105 | 6 | 7 | 6 | 9 |
|  | p(3, 0) | p(3, 1) | p(3, 2) | p(3, 3) |
|  | 4 | 7 | 8 | 11 |

Fig. 8

| p(0, 0) | p(0, 1) | p(0, 2) | p(0, 3) |
|---|---|---|---|
| 22 | 22 | 23 | 24 |

| p(1, 0) | t(0, 0) | t(0, 1) | t(0, 2) | t(0, 3) |
|---|---|---|---|---|
| 1 | 22 | 22 | 23 | 24 |
| p(2, 0) | t(1, 0) | t(1, 1) | t(1, 2) | t(1, 3) |
| 2 | d2 | d1 | d2 | d2 |
| p(3, 0) | t(2, 0) | t(2, 1) | t(2, 2) | t(2, 3) |
| 1 | d1 | d2 | d1 | d1 |
|  | t(3, 0) | t(3, 1) | t(3, 2) | t(3, 3) |
|  | d2 | d1 | d1 | d3 |

Fig. 11

| Header Index | Compressed Size (byte) | Compression ratio (%) |
|---|---|---|
| 1 | 0~32 | 87.5~100 |
| 2 | 33~64 | 75~87.5 |
| 3 | 65~96 | 62.5~75 |
| 4 | 97~128 | 50~62.5 |
| 5 | 129~160 | 37.5~50 |
| 6 | 161~192 | 25~37.5 |
| 7 | 193~224 | 12.5~25 |
| 0 | 225~256 | 0~12.5 |

IMAGE PROCESSING DEVICE AND FRAME BUFFER COMPRESSOR

CROSS-REFERENCE TO RELATED APPLICATION

This application claims priority under 35 U.S.C. 119 to Korean Patent Application No. 10-2018-0151752, filed on Nov. 30, 2018 in the Korean Intellectual Property Office, the disclosure of which is incorporated herein in its entirety by reference.

BACKGROUND

1. Field of the Disclosure

The present disclosure relates to an image processing device and a frame buffer compressor.

2. Description of the Related Art

As a need for high-definition images and high-frame rate images emerges, an amount by which various multimedia intellectual properties (IPs) of an image processing device accesses to a memory, that is, a bandwidth has significantly increased. The various multimedia IPs may be reusable functional blocks having an image processing function, and may be also referred to as IP cores.

When the bandwidth increases, the processing capability of the image processing device reaches the limit, and the speed of recording or playback operation of video image may decrease.

As a result, when the multimedia IP accesses the memory, the data may be compressed or decompressed in size. For example, data may be compressed before writing the data to the memory, and the compressed data may be decompressed before reading the data from the memory.

SUMMARY

Aspects of the present disclosure provide an image processing device with improved processing speed, and a frame buffer compressor used in the image processing device.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an exemplary embodiment of the present inventive concept, an image processing device includes a multimedia IP including a plurality of IP cores, at least one of which processes image data to generate source data, a frame buffer compressor, shared by the plurality of IP cores, compressing the source data to generate compressed data, and a memory coupled to the frame buffer compressor and accessed by the multimedia IP through the frame buffer compressor so that the compressed data is stored in the memory. The frame buffer compressor includes a quantization module which performs quantizing on the source data to generate recon data and a prediction module which executes intra-prediction on the recon data to generate prediction data.

According to an exemplary embodiment of the present inventive concept, a frame buffer compressor compresses source data to generate compressed data with a quantization module performing quantizing to generate recon data, a prediction module performing intra-prediction to generate prediction data, and a mode selector determining whether the frame buffer compressor operates in a lossy compression mode or a lossless compression mode. When the frame buffer compressor operates in the lossy compression mode, the quantization module generates the recon data from the source data, and the prediction module generates the prediction data from the recon data.

According to an exemplary embodiment of the present inventive concept, an image processing device includes a memory storing compressed data, a frame buffer compressor receiving the compressed data and decompressing the compressed data to generate output data, and a multimedia IP including IP cores, the IP cores sharing the frame buffer compressor accessing the memory through the frame buffer compressor and at least one of the IP cores receiving the output data from the frame buffer compressor and processing the output data to generate image data. The frame buffer compressor generates prediction data based on compressed data with a prediction compensation module which performs intra-prediction compensation on the prediction data to generate recon data and an inverse quantization module which performs inverse quantization on the recon data to generate the output data.

BRIEF DESCRIPTION OF THE DRAWINGS

The above and other aspects and features of the present disclosure will become more apparent by describing in detail example embodiments thereof with reference to the attached drawings, in which:

FIG. 4 is a diagram for explaining a source data of FIG. 3;

FIG. 5 is a diagram for explaining the operation of a quantization module of FIG. 3;

FIG. 6 is a diagram for explaining the operation of a prediction module of FIG. 3;

FIG. 7 is a diagram for explaining the operation of the prediction module of FIG. 3;

FIG. 8 is a diagram for explaining the operation of an entropy encoding module of FIG. 3;

FIG. 11 is a table for explaining a compression way of the lossless compressed data of FIG. 10;

DETAILED DESCRIPTION OF THE EMBODIMENTS

Hereinafter, an image processing device according to some embodiments of the present disclosure will be described with reference to FIGS. 1 to 12.

Figure 1:
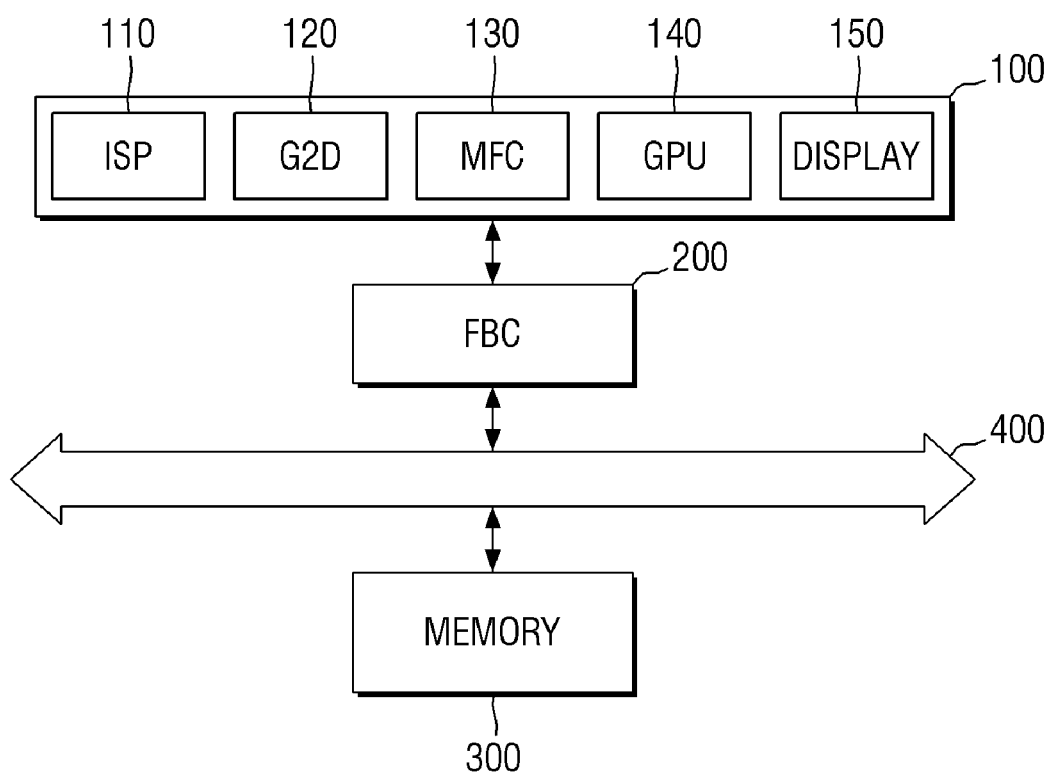
FIG. 1 is a block diagram for explaining an image processing device according to some embodiments of the present disclosure.
Figure 2:
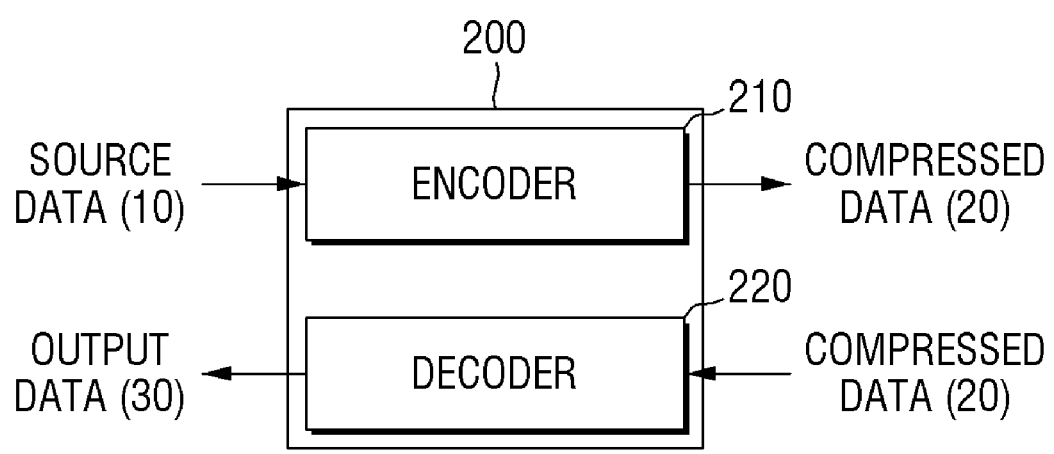
FIG. 2 is a block diagram for explaining a frame buffer compressor of FIG. 1 in detail.

FIG. 1 is a block diagram for explaining the image processing device according to some embodiments of the present disclosure. FIG. 2 is a block diagram for explaining the frame buffer compressor of FIG. 1 in detail.

Referring to FIG. 1, the image processing device according to some embodiments of the present disclosure includes a multimedia IP (intellectual property) 100, a frame buffer compressor 200, a memory 300 and a system bus 400.

The multimedia IP 100 may be a part that directly performs image processing of the image processing device. That is, the multimedia IP 100 may include various modules for performing recording and playback of images such as camcoding and playback of video images.

The multimedia IP 100 may receive image data from the outside such as a camera and convert it into source data 10. At this time, the image data may be a moving image or an image raw data. The source data 10 is data generated by the multimedia IP 100, and may also include data being processed by the multimedia IP 100. That is, the multimedia IP 100 may repeat storing the source data 10 in the memory 300 and updating again, via several stages. In this way the source data 10 may include all the data which are output from the multimedia IP 100 and stored in the memory 300. The source data 10 may be stored in the memory 300 in the form of compressed data 20. The frame buffer compressor 200 may compress the source data 10 to generate the compressed data 20. The memory 300 may store the compressed data 20. Output data 30 may be obtained by decompressing the compressed data 20. The frame buffer compressor 200 may decompress the compressed data 20 stored in the memory to generate the output data 30. At this time, the source data 10 and the output data 30 may be the same or different. This will be explained in more detail below.

Specifically, the multimedia IP 100 includes a plurality of IP cores including an image signal processor (ISP) 110, a motion compensation module (G2D) 120, a multi-format codec (MFC) 130, a graphics processing unit (GPU) 140 and a display 150. However, the present embodiment is not limited thereto. For example, the multimedia IP 100 may include only at least some of the image signal processor 110, the motion compensation module 120, the multi-format codec 130, the GPU 140 and the display 150 mentioned above. That is, the multimedia IP 100 may include a processing module required to access the memory 300 in order to process the moving image or the image raw data.

The image signal processor 110 may receive image data, preprocess it and convert it into the source data 10. At this time, the image data may be an RGB type of data. For example, the image signal processor 110 may convert the RGB type of image data into a YUV type of source data 10.

At this time, the RGB type of data means a data format which expresses colors on the basis of the three primary colors of light. That is, it is a type that expresses images using the three primary colors of red, green, and blue. In contrast, the YUV type means a data format that separately expresses brightness, that is, a luma signal and a chroma signal. That is, Y means a luma signal, and U (Cb) and V (Cr) mean chroma signals, respectively. U means a difference between the luma signal and the blue signal component, and V means a difference between the luma signal and the red signal component. Here, the items of Y, U (Cb) and V (Cr) may be defined as a plane. For example, the data of the luma signal may be referred to as data of a Y plane, and the data of the chroma signal may be referred to as data of a U (Cb) plane or data of a V (Cr) plane.

The YUV type of data may be acquired, for example, by being converted from the RGB type of data, using a conversion formula such as Y=0.3R+0.59G+0.11B, U=(B−Y)× 0.493, V=(R−Y)×0.877.

Since human eyes are sensitive to luma signals, but are less sensitive to color signals, the YUV type of data may be more easily compressed than RGB type of data. As a result, the image signal processor 110 may convert the RGB type of image data into the YUV type of the source data 10.

The image signal processor 110 may convert the image data into the source data 10 and then store it in the memory 300.

The motion compensation module 120 may perform motion compensation of the moving image data or the image raw data. The motion compensation module 120 may read the image data or the decompressed output data 30 from the frame buffer compressor 200 to perform the motion compensation. At this time, the motion compensation means detection and removal of motion of the camera from the moving image data.

The motion compensation module 120 corrects the motion of the image data, the source data 10 or the output data 30 to generate or update the new source data 10, and may store it in the memory 300 through the frame buffer compressor 200. In this case, the frame buffer compressor 200 may compress the source data 10 compensated by the motion compensation module 120 to generate the compressed data 20 and store the compressed data 20 in the memory 300. If the motion compensation module 120 requests the compressed data 20, the frame buffer compressor 200 may decompress the compressed data 20 stored in the memory 300 to generate the output data 30.

The multi-format codec 130 may be a codec that compresses the moving image data using the frame buffer compressor 200. In general, since the moving image data has very large size, there is a need for a compression module that reduces the size thereof. The moving image data may be compressed via association between a plurality of frames, and this may be performed by the multi-format codec 130. The multi-format codec 130 may compress the image data, the source data 10 or the output data 30 from the memory 300 using the frame buffer compressor 200.

The multi-format codec 130 may compress the image data, the source data 10 or the output data 30 to generate or update the new source data 10 and store it in the memory 300 through the frame buffer compressor 200.

The GPU (Graphics Processing Unit) 140 may perform calculation and generation of two-dimensional or three-dimensional graphics. The GPU 140 may perform the calculation process on the image data, the source data 10 or the output data 30. The GPU 140 may process the graphic data in parallel.

The GPU 140 may compress the image data, the source data 10 or the output data 30 to generate or update the new source data 10, and store it in the memory 300 through the frame buffer compressor 200.

The display 150 may display the output data 30 from the memory 300 on a screen. Also, the display 150 may display the source data 10, which is processed by the image signal processor 110, the motion compensation module 120, the multi-format codec 130 or the GPU 140, on the screen. However, the present embodiment is not limited thereto.

The image signal processor 110, the motion compensation module 120, the multi-format codec 130, the GPU 140 and the display 150 of the multimedia IP 100 may operate individually. That is, each of the image signal processor 110, the motion compensation module 120, the multi-format codec 130, the GPU 140 and the display 150 may individually access the memory 300 to write or read the data. The memory 300 may be shared by the image signal processor 110, the motion compensation module 120, the multi-format codec 130, the GPU 140 and the display 150.

The frame buffer compressor 200 may compress the source data 10 to generate the compressed data 20 before the IP cores of the multimedia IP 100 individually access the memory 300. The frame buffer compressor 200 may decompress the compressed data 20 to generate the output data 30. Also, the output data 30 may be transmitted to the multimedia IP 100.

That is, the compressed data 20 compressed by the frame buffer compressor 200 may be stored in the memory 300. Conversely, the output data 30 decompressed by the frame buffer compressor 200 may be loaded by the multimedia IP 100.

In this way, each time the image signal processor 110, the motion compensation module 120, the multi-format codec 130, the GPU 140 and the display 150 of the multimedia IP 100 individually accesses the memory 300, the frame buffer compressor 200 may compress the source data 10 into the compressed data 20 and transfer it to the memory 300. Responsive to a data request from at least one of the image signal processor 110, the motion compensation module 120, the multi-format codec 130, the GPU 140 and the display 150 of the multimedia IP 100, the frame buffer compressor 200 may decompress the compressed data 20 read from the memory 300 into the output data 30 and transmit it to the at least one of the image signal processor 110, the motion compensation module 120, the multi-format codec 130, the GPU 140 and the display 150 of the multimedia IP 100. For the convenience of description, one of the image signal processor 110, the motion compensation module 120, the multi-format codec 130, the GPU 140 and the display 150 of the multimedia IP 100 may access the memory 300 through the frame buffer compressor 200. The frame buffer compressor 200 may decompress the compressed data 20 to generate the output data 30, and transmit the output data 30 to the requesting IP core. For example, the GPU 140 among the plurality of IP cores may request the compressed data 20. In this case, the GPU 140 may access the memory 300 through the frame buffer compressor 200, and the frame buffer compressor 200 may decompress the compressed data 20 to generate the output data 30 and transmit the output data 30 to the GPU 140. The memory 300 is shared by the plurality of IP cores in the multimedia IP 100 through the frame buffer compressor 200, and thus an arbiter may be present in the multimedia IP 100 so that the arbiter may set priority among multiple memory access request from the plurality of IP cores in the multimedia IP 100.

The memory 300 may store the compressed data 20 generated by the frame buffer compressor 200, and may provide the stored compressed data 20 to the frame buffer compressor 200 so that the frame buffer compressor 200 may decompress the stored frame buffer 200.

The system bus 400 is connected to the frame buffer compressor 200 and the memory 300. Specifically, the system bus 400 is connected to each of the frame buffer compressor 200 and the memory 300. The multimedia IP 100 is connected to the frame buffer compressor 200. That is, the multimedia IP 100 is connected to the memory 300 via the frame buffer compressor 200 and the system bus 400.

The frame buffer compressor 200 may convert the source data 10 into the compressed data 20 and convert the compressed data 20 into the output data 30, when each of the image signal processor 110, the motion compensation module 120, the multi-format codec 130, the GPU 140 and the display 150 of the multimedia IP 100 accesses the memory 300.

Referring to FIG. 2, the frame buffer compressor 200 includes an encoder 210 and a decoder 220.

The encoder 210 may compress the source data 10 received from the multimedia IP 100 to generate the compressed data 20. The compressed data 20 may be transmitted to the memory 300 via the system bus 400.

The decoder 220 may decompress the compressed data 20 stored in the memory 300 to generate the output data 30. For example, the compressed data 20 may be transferred from the memory 300 to the frame buffer compressor 200. The compressed data 20 transferred to the frame buffer compressor 200 may be decompressed by the decoder 220.

The output data 30 may be transferred to the multimedia IP 100. At this time, the output data 30 may be transferred to at least one of the image signal processor 110, the motion compensation module 120, the multi-format codec 130, the GPU 140 and the display 150 of the multimedia IP 100. For example, if the output data 30 is requested by an IP core of the multimedia IP 100, for example, the GPU 140, the output data 30 is transferred to the GPU 140.

Figure 3:
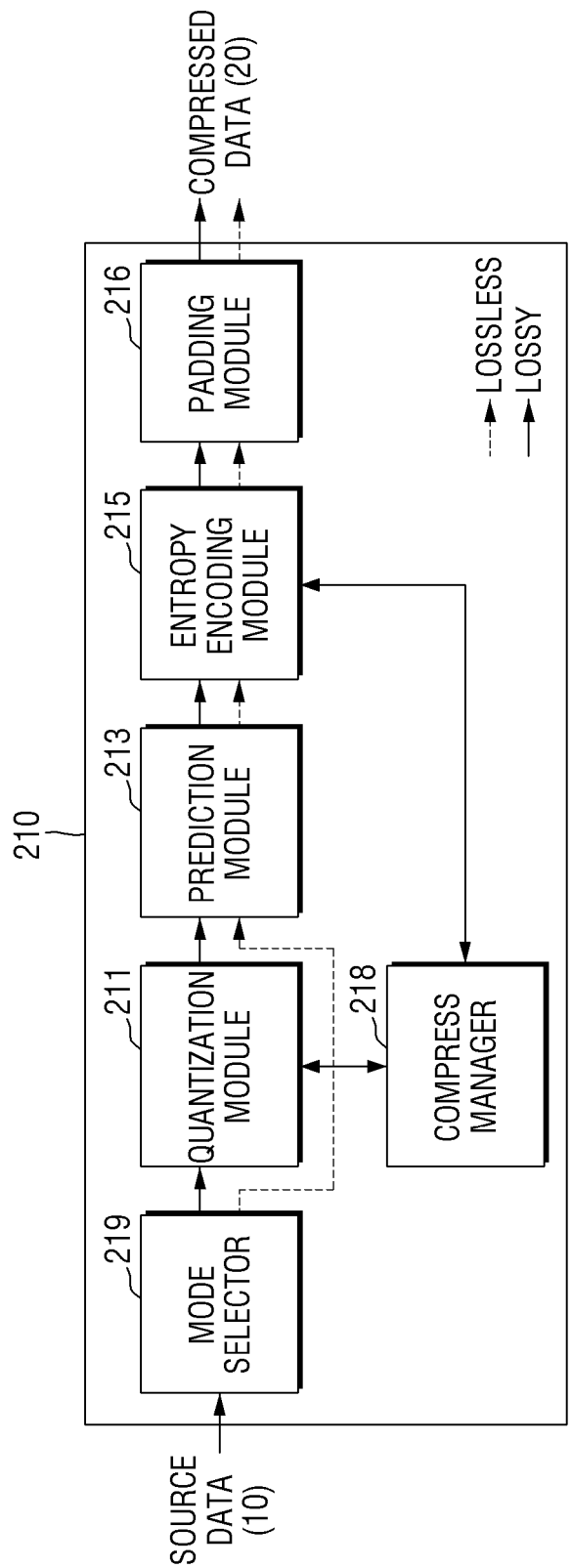
FIG. 3 is a block diagram for explaining an encoder of FIG. 2 in detail.

FIG. 3 is a block diagram for explaining the encoder of FIG. 2 in detail.

Referring to FIG. 3, the encoder 210 includes a first mode selector 219, a quantization module 211, a prediction module 213, an entropy encoding module 215, a padding module 216, and a compression management module 218.

The first mode selector 219 may decide whether the encoder 210 operates in a lossless mode or a lossy mode. If the encoder 210 operates in the lossless mode, the source data 10 may be compressed along a lossless path of FIG. 3. If the encoder 210 operates in the lossy mode, the source data 10 may be compressed along a lossy path.

The first mode selector 219 may receive a signal for deciding a compression mode from the multimedia IP 100. For example, the compression mode includes a lossy compression mode and a lossless compression mode. In the lossless compression mode, compression is performed without lossy of data, and the compression ratio changes depending on the data. Unlike this, in the lossy compression mode, compression is performed with partly loss of data, and the compression ratio is higher than that of the lossless compression mode. In the lossy compression mode, the compression ratio may have a preset fixed compression ratio.

When the encoder 210 operates in the lossless compression mode, the first mode selector 219 may select a lossless compression path including the prediction module 213, the entropy encoding module 215 and the padding module 216. In contrast, when the encoder 210 operates in the lossy compression mode, the first mode selector 219 may select a lossy compression path including the quantization module 211, the prediction module 213, and the entropy encoding module 215. As an example, in the lossless compression mode, the first mode selector 219 transfers the source data 10, which are input to the encoder 210, to the prediction module 213. For example, the first mode selector 219 transfers the source data 10 directly to the prediction module 213, skipping the quantization module 211. In the lossy compression mode, the first mode selector 219 transfers the source data 10, which are input to the encoder 210, to the quantization module 211.

Hereinafter, the quantization module will be described in detail with reference to FIGS. 4 and 5. FIG. 4 is a diagram for explaining the source data of FIG. 3. FIG. 5 is a diagram for explaining the operation of the quantization module 211 of FIG. 3. The quantization module 211 may operate in the lossy compression mode while not working in the lossless compression mode.

In some embodiments, the source data 10 may include a plurality of source pixel data. For example, in FIG. 5, although the source data 10 is illustrated as including a plurality of source pixel data (e.g., s(0,0) to s(3,3)) having four rows and four columns, the embodiment is not limited thereto. For the convenience of description, the operation of the frame buffer compressor 200 will be described with reference to the source data 10 with four rows and four columns. The size of the source data 10 may vary depending on a block size requested by each of the IP cores in the multimedia IP 100.

The quantization module 211 may perform quantization on the source data 10 input to the frame buffer compressor 200, using a predefined quantization coefficient, to generate recon data. For example, the quantization module 211 may quantize each of the plurality of source pixel data with a predefined quantization coefficient to generate recon data. For example, the entire of the source data 10 may be quantized by the quantization module 211 before prediction of the prediction module 213 is performed.

Referring to FIG. 5, the recon data may include recon pixel data (e.g., r(0,0) to r(3,3)). Each of the recon pixel data may be associated with a corresponding one of the plurality of source pixel data. For example, a recon pixel data r(0,0) represents a quantized value of a source pixel data s(0,0). The quantization module 211 may quantize the source pixel data using a predefined quantization coefficient to generate recon pixel data. As an example, the quantization module 211 may divide the source pixel data (e.g., s(0,1)=89) by a predefined quantization coefficient (e.g., 4), and then may generate the quotient of the division operation as the recon pixel data (e.g., r(0,1)=22). For example, when the predefined quantization coefficient is a divisor of four, the quantization module may perform a bit shift operation of two-bits shift to the right on the source pixel data (e.g., $s(0,1)=89=1011001_2$) to generate recon pixel data (e.g., $r(0,1)=22=10110_2$). As such, the two bits on the rightmost are removed (i.e., lost) as a result of the bit shift operation, which causes data loss in the lossy data compression mode. According to an exemplary embodiment, such data loss in a process of compression may be confined within each pixel without affecting another pixel. In other words, no error propagation occurs in the lossy compression mode.

The quantization module 211 according to some embodiments of the present application may perform quantization on all the source pixel data in parallel to generate recon data. For the convenience of description, the source data 10 of FIG. 4 may be represented by a 4×4 matrix. In this case, a matrix division operation with a predetermined quantization coefficient as a divisor may be performed on the source data 10 (i.e., a dividend) of the 4×4 matrix, generating the recon pixel data represented with a 4×4 matrix as a quotient matrix. With the matrix division operation, the quantization module 211 may perform quantization on all the components of the 4×4 matrix for the source pixel data 10 in parallel to generate the recon data of the 4×4 matrix. For the convenience of description, the predefined quantization coefficient is a scalar value. However, the present inventive concept is not limited thereto. For example, the predefined quantization coefficient may be a 4×4 matrix of which components may be different from each other.

Data removed (i.e., lost) while performing quantization may not be restored later. Therefore, the quantization module 211 may be utilized only in the lossy compression mode. However, the lossy compression mode may have a compression ratio relatively higher than that of the lossless compression mode, and may have a preset fixed compression ratio.

The compressed data 20 may include the quantization coefficient used by the quantization module 211. For example, the encoder 210 may add the quantization coefficient used in the quantization module 211 to the compressed data 20.

Hereinafter, the prediction module will be described in detail with reference to FIGS. 6 and 7. FIGS. 6 and 7 are diagrams for explaining the operation of the prediction module of FIG. 3. The prediction module 213 may perform intra-prediction on the source data 10 or the recon data to generate prediction data. Specifically, for example, in FIG. 6, the prediction module 213 performs the intra-prediction on the recon data of FIG. 5 to generate prediction data. In addition, in FIG. 7, the prediction module 213 performs the intra-prediction on the source data 10 to generate prediction data.

Referring to FIG. 6, the prediction data may include a plurality of prediction pixel data (e.g., p(0,0) to p(3,3)) corresponding to each of a plurality of recon pixel data (e.g., r(0,0) to r(3,3)). The prediction pixel data include reference pixel data (e.g., p(0,0) to p(0,3)) and residual pixel data (e.g., p(1,0) to p(3,3)). That is, the prediction data includes the reference pixel data (e.g., p(0,0) to p(0,3)) corresponding to some parts (e.g., r(1,0) to r(0,3)) of the plurality of recon pixel data, and the residual pixel data (e.g., p(1,0) to p(3,3)) corresponding to the remaining parts (e.g., r(1,0) to r(3,3)) of the plurality of recon pixel data. In FIG. 6, the reference pixel data (e.g., p(0,0) to p(0,3)) are illustrated as a first row of the prediction pixel data, but the present application is not limited thereto. As an example, the reference pixel data may be a first column of prediction pixel data. As another example, the reference pixel data may be arbitrarily selected from the prediction pixel data.

The reference pixel data (e.g., p(0,0)=22) contains the corresponding recon pixel data (e.g., r(0,0)=22) as they are, as illustrated in FIG. 6. In FIG. 6, the reference pixel data are illustrated as including the recon pixel data as they are, but the present application is not limited thereto. For example, the reference pixel data may be generated on the basis of an average value of one or more recon pixel data among the plurality of recon pixel data.

The residual pixel data (e.g., p(2,0)=2) may be generated on the basis of a difference between two or more recon pixel data among the plurality of recon pixel data. As another example, the residual pixel data may be generated on the basis of a difference value between two recon pixel data adjacent to each other. In FIG. 6, the residual pixel data is illustrated as including a difference value between two recon pixel data adjacent to each other. For example, the residual pixel data (e.g. p(2,0)) may be obtained from a difference value between its corresponding recon pixel data (e.g. r(2,0))

and another recon pixel data (e.g. r(1,0)) adjacent to the corresponding recon pixel data. The present application is not limited thereto.

The prediction module 213 may reduce the size of the data by expressing some of the plurality of recon pixel data with the residual pixel data. For example, the prediction module 213 may generate the reference pixel data (e.g., p(0,0)=22) and the residual pixel data (e.g., p(1,0)=1, p(2,0)=2, and p(3,0)=1), on the basis of the existing recon pixel data (e.g., r(0,0)=22, 41,0)=22, r(2,0)=25, and r(3,0)=26). At this time, the residual pixel data (e.g., p(1,0)=1, p(2,0)=2, and p(3,0)=1) may have data size smaller than the corresponding recon pixel data (e.g., r(1,0)=22, r(2,0)=25, and r(3,0)=26). Therefore, the size of the prediction data including the reference pixel data and the residual pixel data may be smaller than the size of the recon data.

Referring to FIG. 7, the prediction module 213 may generate prediction data from the source data 10. The process of generating the prediction data from the source data 10 in the prediction module 213 may be the same as the process of generating the prediction data from the recon data described with reference to FIG. 6. Therefore, the detailed description of the process of generating prediction data from the source data 10 in the prediction module 213 will not be provided for convenience of explanation.

The prediction module 213 may compress the size of the data by generating the prediction data including the reference pixel data and the residual pixel data from the source data 10 or the recon data depending on the compression mode. Further, the prediction module 213 may perform intra-prediction on a plurality of source pixel data of the source data 10 or a plurality of recon pixel data of the recon data on a pixel basis to generate prediction data.

On the other hand, it may be difficult to implement hardware for executing sequential calculations in the image processing. From the viewpoint of hardware implementation, it is desirable that modules used for image processing execute calculations in parallel.

The quantization module 211 and the prediction module 213 according to some embodiments of the present application may perform quantization and intra-prediction in parallel for each of a plurality of source pixel data. For example, the quantization module 211 may simultaneously perform quantization on all source pixel data to generate the recon data. Further, the prediction module 213 may generate prediction data including the reference pixel data and the residual pixel data in parallel from the source data or the recon data. For example, the prediction module 213 may operate after the recon data for the entire bits of the source data 10 are obtained using the quantization module 211 in the manner as shown in FIG. 5 for example, and thus may simultaneously obtain the prediction data which are calculated by subtracting two recon pixel data among the plurality of recon pixel data, for example. In other words, multiple subtracting operations may be simultaneously performed on the recon data in the lossy compression mode. In this manner, the quantization module 211 and the prediction module 213 according to some embodiments of the present application may perform quantization and intra-prediction in parallel, respectively. Thus, the frame buffer compressor 200 including the quantization module 211 and the prediction module 213 according to some embodiments of the present application may be suitable for being implemented as hardware.

Hereinafter, the entropy encoding module 215 of FIG. 3 will be described in detail referring to FIGS. 6 and 8. FIG. 8 is a diagram for explaining the operation of the entropy encoding module 215 of FIG. 3. The entropy encoding module 215 may perform entropy encoding on the prediction data compressed by the prediction module 213 to generate entropy data. For example, in FIG. 8, the entropy encoding module 215 may perform entropy encoding on the prediction data of FIG. 6 generated from the recon data to generate entropy data.

The entropy data may include a plurality of entropy pixel data (e.g., t(0,0) to t(3,3)) corresponding to each of the plurality of prediction pixel data (e.g., p(0,0) to p(3,3)).

The entropy encoding module 215 may determine an entropy frequency of each of the plurality of prediction pixel data. For example, the entropy encoding module 215 may decide the entropy frequency, indicating the number of prediction pixel data having the same value, for each of a plurality of prediction pixel data (e.g., p(1,0)=1 or p(2,0)=2). Specifically, the number of prediction pixel data having the same value as "p(1,0)=1" is 5. Therefore, the entropy frequency of the prediction pixel data p(1,0) is 5. Also, the number of prediction pixel data having the same value as "p(2,0)=2" is 6. Therefore, the entropy frequency of the prediction pixel data p(2,0) is 6.

The entropy encoding module 215 may decide the entropy pixel data on the basis of the entropy frequency. For example, the entropy encoding module 215 may allow the entropy pixel data (e.g., t(1,1), t(2,0), t(2,2), t(2,3), t(3,1) and t(3,2)) corresponding to the prediction pixel data (e.g., p(1,1), p(2,0), p(2,2), p(2,3), p(3,1) and p(3,2)) having the highest entropy frequency (e.g., 6) to have data of the smallest size (e.g., "d1"). In addition, the entropy encoding module 215 may allow the entropy pixel data (e.g., t(1,0), t(1,2), t(1,3), t(2,1), and t(3,0)) corresponding to the prediction pixel data (e.g., p(1,0), p(1,2), p(1,3), p(2,1), and p(3,0)) having the second highest entropy frequency (e.g., 5) to have data of the second smallest size (e.g., "d2"). In this way, the entropy encoding module 215 may set the entropy pixel data on the basis of the entropy frequency. In FIG. 8, the entropy encoding module 215 performs entropy encoding on the residual pixel data of the prediction data, but the present application is not limited thereto. For example, the entropy encoding module 215 may perform entropy encoding on all of the reference pixel data and the residual pixel data of the prediction data.

In this way, the entropy encoding module 215 may generate prediction data depending on the entropy frequency to reduce the size of the prediction data.

In addition, as illustrated in FIG. 7, the entropy encoding module 215 may perform entropy encoding on the prediction data generated from the source data to generate entropy data. This is almost similar to the operation of the entropy encoding module 215 described above with reference to FIG. 8, and the detailed description thereof will not be provided for convenience of explanation.

As discussed above, the entropy encoding module 215 may compress the prediction data, using Huffman coding. The present invention is not limited thereto. For example, the entropy encoding module 215 may compress the prediction data via exponential golomb coding or golomb rice coding.

The padding module 216 may perform padding on the entropy data generated by the entropy encoding module 215 to generate padding data. For example, the padding module 216 may add meaningless data (e.g., zero data) to the entropy data to generate padding data having a predefined size.

As an example, if the encoder 210 operates in the lossy compression mode, the size of the padding data may be defined on the basis of the size of the source data and a fixed compression rate. Specifically, for example, when the size of the source data 10 is 100 bits and the fixed compression ratio is 50%, the size of the padding data may be defined as 50 bits. On the other hand, the size of the entropy data compressed by the quantization module 211, the prediction module 213, and the entropy encoding module 215 may be smaller than 50 bits. In this case, the padding module 216 may add zero data to the entropy data to generate padding data having the predefined size of 50 bits.

As another example, if the encoder 210 operates in the lossless compression mode, the size of the padding data may be defined on the basis of the size of the source data. Specifically, for example, when the size of the source data 10 is 100 bits, the size of the padding data may be defined as 100 bits. On the other hand, the size of the entropy data compressed by the prediction module 213 and the entropy encoding module 215 may be smaller than 100 bits. In this case, the padding module 216 may add zero data to the entropy data to generate padding data having the predefined size of 100 bits.

In this way, the padding module 216 may generate the padding data having a predefined size from the entropy data compressed by other modules of the encoder 210. The encoder 210 may output the padding data as the compressed data 20. That is, the compressed data 20 stored in the memory 300 may have a predetermined size by the padding module 216.

The compression management module 218 may control compression on the source data 10 in the quantization module 211 and the entropy encoding module 215, on the basis of the determined quantization coefficients and entropy table.

The compression management module 218 may determine quantization coefficients used in the quantization module 211. For example, when the encoder 210 operates in the lossy compression mode, the source data 10 is compressed along the lossy path of FIG. 3. At this time, the compression management module 218 may include a QP table including quantization coefficients. For example, the QP table includes one or more entries, and each entry may include a quantization coefficient used in the quantization module 211. Since concepts such as the QP table or the quantization coefficient correspond to the contents already known as an image compression technology, the detailed description thereof will not be provided in this specification.

Also, the compression management module 218 may determine an entropy table representing entropy pixel data based on entropy frequencies each used for entropy coding. For example, the compression management module 218 may include an entropy table. The entropy table means a plurality of code tables each of which is identified through a k value to execute the entropy coding algorithm, and the entropy table that may be used in some embodiments of the present disclosure may include at least one of an exponential golomb code and a golomb rice code. Since concepts relating to the entropy coding, the exponential golomb coding algorithm, the golomb rice coding algorithm and the like correspond to the contents already known as data compression technology, the specific description thereof will not be provided in this specification.

Thereafter, the frame buffer compressor 200 may write the compressed data 20 generated from the encoder 210 to the memory 300. Also, the frame buffer compressor 200 may read the compressed data 20 from the memory 300 and may decompress the read compressed data 20 to provide it to the multimedia IP 100.

Figure 9:
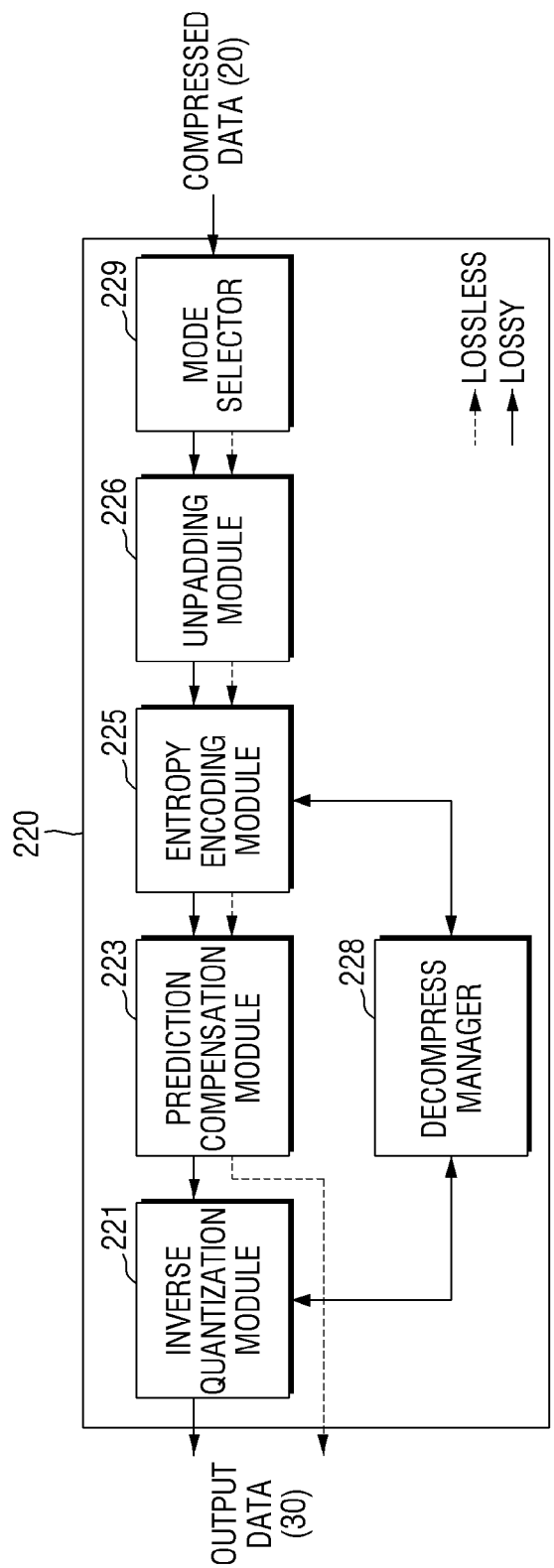
FIG. 9 is a block diagram for explaining a decoder of FIG. 2 in detail.

FIG. 9 is a block diagram for explaining the decoder of FIG. 2 in detail.

Referring to FIG. 9, the decoder 220 includes a second mode selector 229, an unpadding module 226, an entropy decoding module 225, a prediction compensation module 223, and an inverse quantization module 221.

The second mode selector 229 may decide whether the compressed data 20 stored in the memory 300 is lossless-compressed or lossy-compressed. At this time, the second mode selector 229 may decide by which mode of the lossless compression mode or the lossy compression mode the compressed data 20 is compressed through the presence or absence of a header. This will be explained in more detail later.

In the case of the lossless compression mode, the second mode selector 229 may select the lossless path along which the compressed data 20 flow. The lossless path includes the unpadding module 226, the entropy decoding module 225 and the prediction compensation module 223. In the case of the lossy compression mode, the second mode selector 229 may select the lossy compression path along which the compressed data 20 flow. The lossy compression path includes the unpadding module 226, the entropy decoding module 225, the prediction compensation module 223, and the inverse quantization module 221.

The unpadding module 226 may remove meaningless data (e.g., zero data) added by the padding module 216 of the encoder 210. For example, the unpadding module 226 may remove the zero data from the compressed data 20 to generate entropy data. The entropy data generated by the unpadding module 226 may be transferred to the entropy decoding module 225.

The entropy decoding module 225 may decompress the data compressed by the entropy encoding module 215 of the encoder 210. That is, the entropy decoding module 225 may generate prediction data from the entropy data transferred from the unpadding module 226. The compressed data 20 input to the decoder 220 contains the k value. The entropy decoding module 225 may perform entropy decoding, using the entropy table identified from the k value. For example, the entropy decoding module 225 may generate residual pixel data and reference pixel data corresponding to each of the entropy pixel data, using the entropy table. That is, the entropy decoding module 225 may generate prediction data that includes the residual pixel data and the reference pixel data. The prediction data generated from the entropy decoding module 225 may be transferred to the prediction compensation module 223.

In some embodiments, the entropy decoding module 225 may perform decompression via Huffman encoding, exponential golomb coding or golomb rice coding. The Huffman encoding, the exponential golomb coding or the golomb rice coding may be a technique that are normally used, and the detailed description thereof will not be provided.

The prediction compensation module 223 may perform intra-prediction compensation on the prediction data to decompress the prediction data transferred from the entropy decoding module 225. That is, the prediction compensation module 223 may perform intra-prediction compensation on the prediction data to generate the recon data or the output data 30 depending on the compression mode. For example, when the compressed data 20 is compressed in the lossy compression mode, the prediction compensation module 223 may generate the recon data and transfer it to the inverse quantization module 221. Further, when the compressed data 20 is compressed in the lossless compression mode, the prediction compensation module 223 may generate the output data 30. In this case, the decoder 220 may transfer the output data 30 to the multimedia IP 100.

For example, the prediction compensation module 223 may decompress the prediction data by performing the intra-prediction by the prediction module 213 in a reverse order. The prediction data may include a plurality of prediction pixel data. Each of the plurality of prediction pixel data may be reference pixel data or residual pixel data.

As an example, the prediction compensation module 223 may generate a plurality of recon pixel data, using the reference pixel data or the residual pixel data. For example, the prediction compensation module 223 may generate recon pixel data corresponding to the reference pixel data, using the reference pixel data. Further, the prediction compensation module 223 may generate the recon pixel data corresponding to the residual pixel data, using the reference pixel data and the residual pixel data. As described above, the prediction compensation module 223 may transfer the recon data including the plurality of recon pixel data to the inverse quantization module 221.

As another example, the output data 30 may include output pixel data corresponding to each of a plurality of prediction pixel data. The prediction compensation module 223 may generate a plurality of output pixel data, using the reference pixel data or the residual pixel data. For example, the prediction compensation module 223 may generate output pixel data corresponding to the reference pixel data, using the reference pixel data. In addition, the prediction compensation module 223 may generate the output pixel data corresponding to the residual pixel data, using the reference pixel data and the residual pixel data. As described above, the decoder 220 may transfer the output data 30 including a plurality of output pixel data to the multimedia IP 100.

In this way, the prediction compensation module 223 may restore the intra-prediction executed on a pixel basis in accordance with the prediction module 213.

The inverse quantization module 221 may generate the output data 30 from the quantization coefficients from the compressed data 20 and the recon data transferred from the prediction compensation module 223. That is, the inverse quantization module 221 may perform the inverse quantization on the recon data using the quantization coefficients, and may generate the output data 30 as a result. For example, the recon data may include a QP table determined by the compression management module 218 of the encoder 210. The inverse quantization module 221 may determine the quantization coefficient from the QP table.

For example, the output data 30 may include a plurality of output pixel data corresponding to each of the plurality of recon pixel data. The output pixel data may be generated by performing the inverse quantization on the corresponding recon pixel data. For example, the output pixel data may be generated by multiplying the corresponding recon pixel data by a quantization coefficient. Also, the output pixel data may be generated by performing a bit shift calculation on the corresponding recon pixel data.

In this way, the inverse quantization module 221 may generate the output data 30 from the recon data. At this time, the output data 30 generated by the inverse quantization module 221 may be different from the source data 10 that is input to the encoder 210. The reason is that data smaller than the quantization coefficient is lost and may not be restored, when quantization is performed on the source data 10 in the quantization module 211 of the encoder 210. Therefore, the inverse quantization module 221 may be utilized only in the lossy mode.

The decompression management module 228 may perform a work in which the combination of the QP table and the entropy table determined to execute compression of the source data 10 by the compression management module 218, which is described above with reference to FIG. 3, may be properly reflected when decompressing the compressed data 20.

Figure 10:
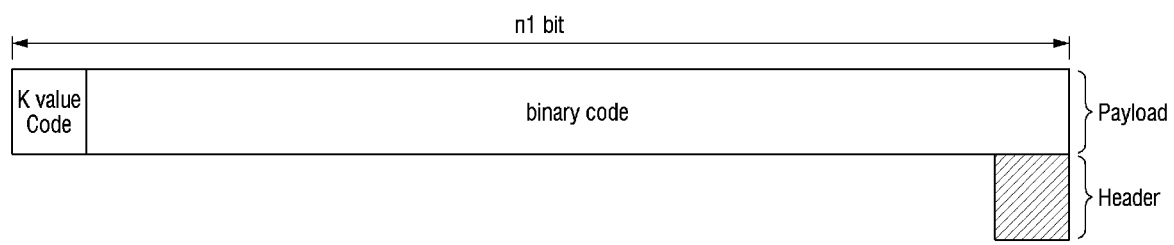
FIG. 10 is a diagram for explaining a structure of lossless compressed data by the image processing device of the present disclosure.

FIG. 10 is a diagram for explaining a data structure of data lossless-compressed by the image processing device of the present disclosure. Referring to FIG. 10, the compressed data 20 includes a payload and a header. The header is a part for displaying a compression ratio, and the payload is a part for displaying actual compressed data and values necessary for decompression.

FIG. 10 is a table for explaining lossless compression of a block having a block size of 16×16 as an example. A pixel depth means a bit value of the value expressed in one pixel. For example, in the example of FIG. 10, the values expressed in each pixel may be 0 to 255.

In the memory 300, the size of data that may be accessed at a time on a hardware basis is determined. The size of the data access unit of the memory 300 may mean the size of the data that may be accessed in the memory 300 at a time. For the sake of convenience, FIG. 10 will be described assuming that the size of the data access unit of the memory 300 is 32 bytes.

A pixel has data of size of 8 bits, that is, 1 byte, and the 16×16 block may have data of a total size of 256 bytes. That is, the size of the source data 10 may be 256 bytes.

In the case of lossless compression, the size of the compressed data may vary every time, and in order to read the compressed data in the memory 300, the size of the compressed data needs to be recorded separately. However, when the size of the compressed data is recorded as it is, since the compression efficiency may decrease depending on the size of the recording, the compression ratio may be standardized and the compression efficiency may be increased.

Specifically, in FIG. 11, the standard of the compression rate was defined in accordance with 32 bytes which are the size of the data access unit of the memory 300. For example, when the size of the compressed data is 0 to 32 bytes, since the compression ratio is 100 to 87.5%, at this time, the work of adjusting the compression ratio to 87.5% (that is, the work of adjusting the size of the compressed data to 32 bytes) may be performed to record 1 on the header.

The padding module 216 of FIG. 3 may perform a work of adjusting the size of the compressed data 20 to the maximum size of the standard. That is, when the size of the compressed data is 170 bytes, since the size is between 161 and 192 bytes, a padding work of adding "0" of 22 bytes may be performed so that the compressed data becomes 192 bytes.

In this way, compressed data in which the size is adjusted to the standard by the padding module 216 may be the payload of the compressed data 20. As a result, the payload size (n1 bit) may be an integer multiple of the size of the data access unit of the memory 300.

Figure 12:
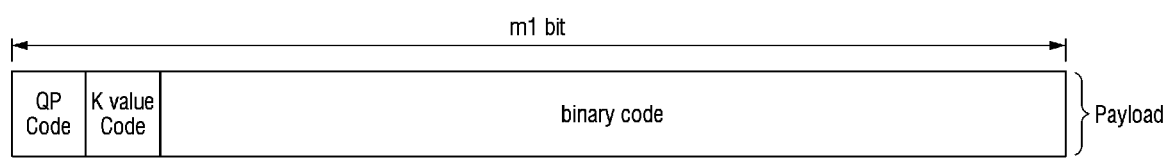
FIG. 12 is a diagram for explaining the structure of lossy compressed data by the image processing device of the present disclosure.

The header may be a part for expressing the header index of FIG. 12. The size of the header may vary depending on the size of the compressed data, but in the case like FIG. 8, since only 0 to 70 are expressed, the size may be 3 bits.

The header and the payload may be stored in different areas of the memory 300. That is, the header is stored to be adjacent to other headers, and the payload may be stored to be adjacent to other payloads.

The payload includes a binary code and a k value code. The binary code may be a part in which the source data 10 is compressed. The k value code may mean the k value defined in the entropy encoding module 215.

The binary code may include data values of the entire blocks. Therefore, the binary code may continuously contain data of individual pixels included in the block.

FIG. 12 is a diagram for explaining the structure of data lossy-compressed by the image processing device of the present disclosure. Referring to FIG. 12, the compressed data 20 compressed in the lossy mode includes only a payload without a header.

The payload includes a binary code, a k value code and a quantization coefficient code (QP code). The quantization coefficient code may be a part for displaying the quantization coefficient used by the quantization module 213 of FIG. 3. The inverse quantization module 223 of the decoder 220 may decompress the data compressed by the quantization module 213 using the quantization coefficient code later.

In the lossy mode, since the compression ratio is fixed, the size of the output data 30, that is, the size (ml bit) of the payload may be fixed.

Figure 13:
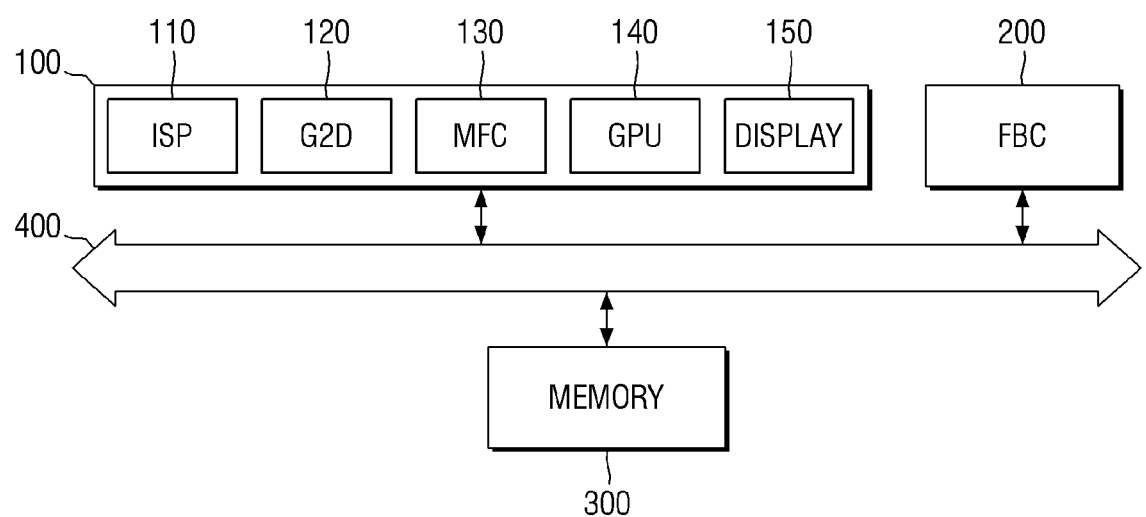
FIG. 13 is a block diagram for explaining the image processing device according to some embodiments of the present disclosure.

Hereinafter, an image processing device according to some embodiments of the present disclosure will be described referring to FIG. 13. The descriptions of the same parts as those described above will be simplified or omitted. FIG. 13 is a block diagram for explaining the image processing device according to some embodiments of the present disclosure.

Referring to FIG. 13, each of the frame buffer compressor 200, the multimedia IP 100, and the memory 300 of the image processing device according to some embodiments of the present disclosure may be connected directly to the system bus 400.

The frame buffer compressor 200 is not directly connected to the multimedia IP 100 and may be connected to the multimedia IP 100 via the system bus 400. For example, the multimedia IP 100 may communicate data with the frame buffer compressor 200 each other via the system bus 400. That is, in a compressing process, the multimedia IP 100 may transmit the source data 10 to the frame buffer compressor 200 via the system bus 400. Subsequently, the frame buffer compressor 200 may generate the compressed data 20 from the source data 10 and transmit the compressed data 20 to the memory 300 again via the system bus 400.

Further, in the decompressing process, the compressed data 20 stored in the memory 300 is transmitted to the frame buffer compressor 200 via the system bus 400, and may be decompressed into the output data 30. Subsequently, the frame buffer compressor 200 may transmit the output data 30 to the multimedia IP 100 via the system bus 400.

In the case of this embodiment, even if the frame buffer compressor 200 is not individually connected to the image signal processor 110, the motion compensation module 120, the multi-format codec 130, the GPU 140 and the display 150 of the multimedia IP 100, since the frame buffer compressor 200 is connected via the system bus 400, the hardware configuration is simplified, and the operation speed may be improved.

Figure 14:
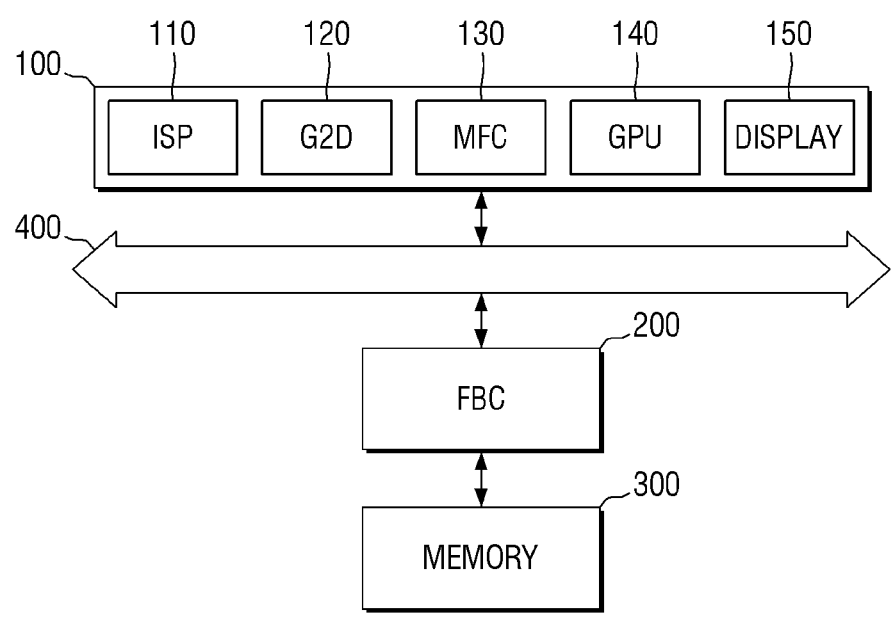
FIG. 14 is a block diagram for explaining the image processing device according to some embodiments of the present disclosure.

Hereinafter, the image processing device according to some embodiments of the present disclosure will be described with reference to FIG. 14. The descriptions of the same parts as those described above will be simplified or omitted. FIG. 14 is a block diagram for explaining the image processing device according to some embodiments of the present disclosure.

Referring to FIG. 14, in the image processing device according to some embodiments of the present disclosure, the system bus 400 is directly connected to the multimedia IP 100 and the frame buffer compressor 200, and the memory 300 is connected to the system bus 400 via the frame buffer compressor 200.

That is, the memory 300 is not directly connected to the system bus 400 but may be connected to the system bus 400 only via the frame buffer compressor 200. Further, the image signal processor 110, the motion compensation module 120, the multi-format codec 130, the GPU 140 and the display 150 of the multimedia IP 100 may be directly connected to the system bus 400. Therefore, the image signal processor 110, the motion compensation module 120, the multi-format codec 130, the GPU 140 and the display 150 of the multimedia IP 100 need to go through the frame buffer compressor 200 to access the memory 300.

In the present embodiment, since the frame buffer compressor 200 is involved in all access to the memory 300, the frame buffer compressor 200 is directly connected to the system bus 400, and the memory 300 is connected to the system bus 400 via the frame buffer compressor 200. Thus, it is possible to reduce errors in data transmission and improve speed.

Figure 15:
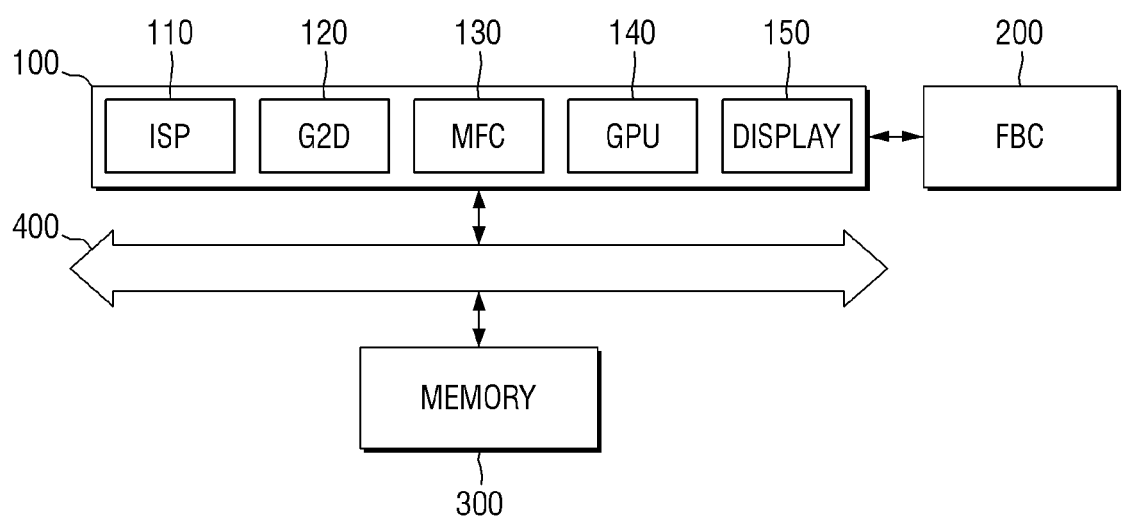
FIG. 15 is a block diagram for explaining the image processing device according to some embodiments of the present disclosure.

Hereinafter, the image processing device according to some embodiments of the present disclosure will be described referring to FIG. 15. The descriptions of the same parts as those described above will be simplified or omitted. FIG. 15 is a block diagram for explaining the image processing device according to some embodiments of the present disclosure.

Referring to FIG. 15, in the image processing device according to some embodiments of the present disclosure, the system bus 400 is directly connected to the multimedia IP 100 and the memory 300. The frame buffer compressor 200 is directly connected to the multimedia IP 100. The frame buffer compressor 200 may receive the source data 10 from the multimedia IP 100. The frame buffer compressor 200 compresses the source data 10 to generate the compressed data 20, and may transfer the compressed data 20 to the multimedia IP 100 again. The multimedia IP 100 may store the compressed data 20 in the memory 300 via the system bus 400.

In the decompressing process, the multimedia IP 100 may receive the compressed data 20 from the memory 300 via the system bus 400. The multimedia IP 100 may transfer the compressed data 20 to the frame buffer compressor 200. The frame buffer compressor 200 decompresses the compressed data 20 to generate the output data 30, and may transfer the output data 30 to the multimedia IP 100 again.

Figure 16:
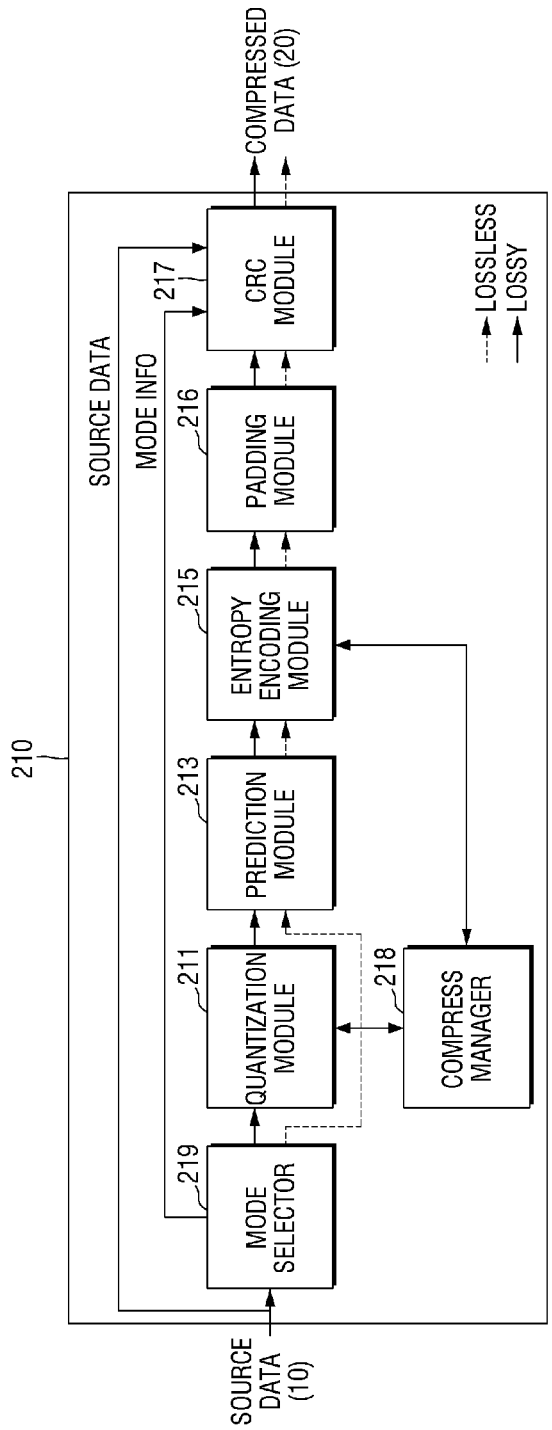
FIG. 16 is a block diagram for explaining an encoder according to some embodiments of the present disclosure.
Figure 17:
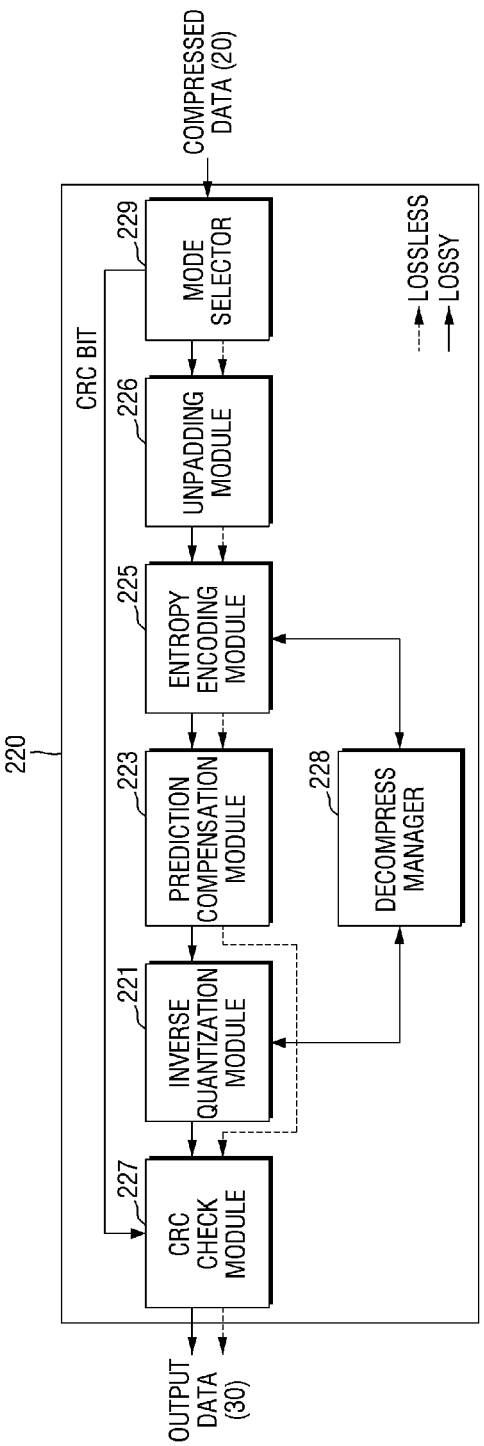
FIG. 17 is a block diagram illustrating a decoder according to some embodiments of the present disclosure.

Hereinafter, the image processing device according to some embodiments of the present disclosure will be described with reference to FIGS. 1, 2, 16, and 17. The descriptions of the same parts as those described above will be simplified or omitted. FIG. 16 is a block diagram for explaining an encoder according to some embodiments of the present disclosure. FIG. 17 is a block diagram illustrating a decoder according to some embodiments of the present disclosure.

Referring to FIG. 16, the encoder 210 further includes a CRC module 217. The CRC module 217 may generate compressed data 20 by adding a CRC code to the padding data generated from the padding module 216. For example, the CRC module 217 may generate the CRC code on the basis of the source data 10 input to the encoder 210, the mode information (mode info) output from the first mode selector 219, and the padding data output from the padding module 216. The CRC code is generated on the basis of the source data 10 and may be a code for verifying an error of the output data 30. The CRC code may be an ordinary code for detecting an error of the original data, and a detailed description thereof will not be provided.

Referring to FIG. 17, the decoder 220 further includes a CRC check module 227. The CRC check module 227 may detect an error of the output data 30 generated from the inverse quantization module 221 or the prediction compensation module 223. The CRC check module 227 may detect an error of the output data 30 on the basis of the mode information (mode info) output from the second mode selector 229 and the CRC code. For example, the second mode selector 229 may separate the CRC code and transfer it to the CRC check module 227 before the compressed data 20 is input to the unpadding module 216. Further, the second mode selector 229 determines the compression mode (lossy or lossless) of the compressed data 20 by presence or absence of the header of the compressed data 20, and may transfer the mode information to the CRC check module 227. The CRC check module 227 may detect the error of the output data 30 by comparing the output code calculated from the output data 30 with the CRC code.

In some embodiments, the CRC check module 227 may include an error mark in the output data 30 if an error of the output data 30 is detected. For example, if an error is detected in the output data 30, the CRC check module 227 may dye the output data 30 with a specific color (e.g., black). In addition, when an error mark is displayed in the output data 30, the multimedia IP 100 may display an error in the image data. For example, when the output data 30 is dyed with black, the multimedia IP 100 may dye the image data with black.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. An image processing device comprising:
a multimedia IP including a plurality of IP cores, at least one of which processes image data to generate source data;
a frame buffer compressor shared by the plurality of IP cores and configured to compress the source data to generate compressed data; and
a memory coupled to the frame buffer compressor and accessed by the multimedia IP through the frame buffer compressor, the memory configured to store the compressed data,
wherein the frame buffer compressor includes a quantization module configured to perform quantizing on the source data to generate recon data, and a prediction module configured to execute intra-prediction on the recon data to generate prediction data, and
wherein the source data comprises a plurality of source pixel data, and the quantization module is configured to perform a division operation on each of the plurality of source pixel data using a predefined, constant, quantization coefficient as a divisor to generate the recon data which correspond to quotients obtained by the division operation.

2. The image processing device of claim 1,
wherein the compressed data comprises the predefined quantization coefficient.

3. The image processing device of claim 1,
wherein the recon data comprises a plurality of recon pixel data of the image data in a same frame, and
wherein the prediction module is configured to determine reference pixel data from one or more recon pixel data of the plurality of recon pixel data, and set differences between each of remaining parts of the plurality of recon pixel data and a corresponding one of the reference pixel data as the residual pixel data.

4. The image processing device of claim 3,
wherein the reference pixel data is generated on the basis of an average value of the one or more recon pixel data of the plurality of recon pixel data.

5. The image processing device of claim 1,
wherein the prediction data comprises a plurality of prediction pixel data, the frame buffer compressor further comprises an entropy encoding module which performs entropy encoding on the prediction data based on an entropy frequency of the plurality of prediction pixel data to generate entropy data, and
the entropy frequency is calculated based on a number of prediction pixel data having the same value among the plurality of prediction pixel data.

6. The image processing device of claim 5,
wherein the frame buffer compressor further comprises a padding module which adds zero data to the entropy data to generate padding data having a predefined size.

7. The image processing device of claim 6,
wherein the frame buffer compressor comprises a CRC module which adds a CRC code to the padding data for verifying an error of the compressed data, and the CRC module generates the CRC code based on the source data.

8. An image processing device comprising:
a multimedia IP including a plurality of IP cores, at least one of which processes image data to generate source data;
a frame buffer compressor shared by the plurality of IP cores and configured to compress the source data to generate compressed data; and
a memory coupled to the frame buffer compressor and accessed by the multimedia IP through the frame buffer compressor, the memory configured to store the compressed data,
wherein the frame buffer compressor includes a quantization module configured to perform quantizing on the source data to generate recon data, and a prediction module configured to execute intra-prediction on the recon data to generate prediction data, and
wherein the source data comprises a plurality of source pixel data, and
the quantization module is configured to perform a division operation on each of the plurality of source pixel data using a predefined, constant, quantization coefficient as a divisor to generate the recon data which correspond to quotients obtained by the division operation,
wherein the frame buffer compressor further comprising:
a mode selector which determines whether the frame buffer compressor operates in a lossy compression mode or a lossless compression mode,
wherein, when the frame buffer compressor operates in the lossy compression mode, the quantization module generates the recon data from the source data, and the prediction module generates the prediction data from the recon data.

9. The image processing device of claim 8,
wherein, when the frame buffer compressor operates in the lossy compression mode, the mode selector transfers the source data, which is input to the frame buffer compressor, to the quantization module.

10. The image processing device of claim 8,
wherein, when the frame buffer compressor operates in the lossless compression mode, the prediction module generates the prediction data from the source data.

11. The image processing device of claim 10,
wherein, when the frame buffer compressor operates in the lossless compression mode, the mode selector transfers the source data, which is input to the frame buffer compressor, to the prediction module.

12. The image processing device of claim 8,
wherein the frame buffer compressor decompresses the compressed data to generate output data,
the frame buffer compressor further comprises a prediction compensation module which performs intra-predicting compensation on the prediction data, and an inverse quantization module which performs inverse quantizing on the recon data, and
when the frame buffer compressor operates in the lossy compression mode, the prediction compensation module generates the recon data from the prediction data, and the inverse quantization module generates the output data from the recon data.

13. The image processing device of claim 12,
wherein, when the frame buffer compressor operates in the lossy compression mode, the mode selector transfers the recon data generated by the prediction compensation module to the inverse quantization module.

14. The image processing device of claim 12,
wherein, when the frame buffer compressor operates in the lossless compression mode, the prediction compensation module generates the output data from the prediction data.

15. The image processing device of claim 14,
wherein, when the frame buffer compressor operates in the lossless compression mode, the prediction compensation module outputs the output data to outside of the frame buffer compressor.

16. An image processing device comprising:
a memory storing compressed data;
a frame buffer compressor receiving source data and compressing the source data to generate the compressed data which are stored in the memory, and receiving the compressed data and decompressing the compressed data to generate output data; and
a multimedia IP including a plurality of IP cores, the plurality of IP cores sharing the frame buffer compressor and at least one of the plurality of IP cores receiving the output data from the frame buffer compressor, accessing the memory through the frame buffer compressor and processing the output data to generate image data,
wherein the frame buffer compressor is configured to compress the source data to generate the compressed data,
wherein the frame buffer compressor includes a quantization module configured to perform quantizing on the source data to generate recon data, and a prediction module configured to execute intra-prediction on the recon data to generate prediction data, and
wherein the frame buffer compressor is further configured to generate the prediction data based on the compressed data, and
wherein the frame buffer compressor further includes a prediction compensation module configured to perform intra-prediction compensation on the prediction data to generate the recon data, and an inverse quantization module which performs inverse quantization on the recon data to generate the output data, and
wherein the source data comprises a plurality of source pixel data, and
the quantization module is configured to perform a division operation on each of the plurality of source pixel data using a predefined, constant, quantization coefficient as a divisor to generate the recon data which correspond to quotients obtained by the division operation.

17. The image processing device of claim 16,
wherein the compressed data comprises a cyclic redundancy check (CRC) code for detecting an error of the output data, and
the frame buffer compressor further comprises a CRC check module which detects an error in the output data, using the CRC code.

18. The image processing device of claim 17,
wherein the CRC check module includes an error mark in the output data when the error of the output data is detected, and
the multimedia IP displays an error in the image data when the error mark is included in the output data.

19. The image processing device of claim 16,
wherein the compressed data comprises a predefined quantization coefficient,
the recon data comprises a plurality of recon pixel data, and
the inverse quantization module performs inverse quantizing on each of the plurality of recon pixel data using the predefined quantization coefficient to generate the output data.

* * * * *